(12) United States Patent
Trethewey et al.

(10) Patent No.: US 8,983,460 B2
(45) Date of Patent: Mar. 17, 2015

(54) SENSOR AND CONTEXT BASED ADJUSTMENT OF THE OPERATION OF A NETWORK CONTROLLER

(75) Inventors: James R. Trethewey, Hillsboro, OR (US); Arvind Kumar, Beaverton, OR (US); Kristoffer D. Fleming, Chandler, AZ (US); Ajay V. Bhatt, Portland, OR (US); Roger A. Hurwitz, Portland, OR (US); Huaiyu Liu, Portland, OR (US); Stuart A. Golden, Rocklin, CA (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 13/608,419

(22) Filed: Sep. 10, 2012

(65) Prior Publication Data

US 2014/0073302 A1 Mar. 13, 2014

(51) Int. Cl.
*H04W 4/00* (2009.01)
*H04W 24/02* (2009.01)

(52) U.S. Cl.
CPC ............... *H04W 24/02* (2013.01); *Y02B 60/50* (2013.01)
USPC ........ 455/434; 455/456.1; 455/423; 455/441; 455/404.2

(58) Field of Classification Search
CPC ...... H04W 48/16; H04W 48/18; H04W 48/20
USPC ................... 455/434, 456.1, 423, 441, 404.2
See application file for complete search history.

(56) References Cited

U.S. PATENT DOCUMENTS

| | | | |
|---|---|---|---|
| 7,213,057 B2 | 5/2007 | Trethewey et al. | |
| 2003/0013450 A1* | 1/2003 | Wang et al. | 455/442 |
| 2003/0115339 A1 | 6/2003 | Hodoshima | |
| 2003/0145138 A1 | 7/2003 | Motoyama | |
| 2004/0203851 A1 | 10/2004 | Vetro et al. | |
| 2005/0060377 A1 | 3/2005 | Lo et al. | |
| 2005/0060575 A1 | 3/2005 | Trethewey et al. | |
| 2005/0131715 A1 | 6/2005 | Trethewey | |
| 2006/0244590 A1* | 11/2006 | Itoh et al. | 340/539.23 |
| 2007/0079030 A1 | 4/2007 | Okuley et al. | |
| 2007/0274254 A1 | 11/2007 | Iwazaki et al. | |
| 2008/0152034 A1 | 6/2008 | Liu et al. | |
| 2010/0214611 A1 | 8/2010 | Watanabe | |
| 2013/0196594 A1* | 8/2013 | Moosavi | 455/41.1 |

FOREIGN PATENT DOCUMENTS

WO 2014/039822 A1 3/2014

OTHER PUBLICATIONS

Needham, et al. "Orientation Sensing Computing Devices", PCT Patent Application No. PCT/US2012/030488 flied on Mar. 25, 2012, 29 pages.
Trethewey, et al., "Providing Support for Device States", U.S. Appl. No. 13/608,683, mailed on Sep. 10, 2012, 30 pages.

(Continued)

*Primary Examiner* — Nghi H Ly
(74) *Attorney, Agent, or Firm* — International IP Law Group, P.L.L.C.

(57) ABSTRACT

A method to adjust operation of a network controller of a device is disclosed. The method may include receiving contextual data from a sensor communicatively coupled to the device. The method may also include analyzing the contextual data to determine the context of the device. The method may also include modifying the network controller operation based on the analyzed contextual data.

33 Claims, 4 Drawing Sheets

(56) References Cited

OTHER PUBLICATIONS

Trethewey, et al., "Providing Support for Display Articulation-Related Applications" U.S. Appl. No. 13/608,358, mailed on Sep. 10, 2012, 26 pages.

Trethewey, et al., "Providing Support for Position-Related Applications", U.S. Appl. No. 13/608,159, filed Sep. 10, 2012, 30 pages.

Kumar, et al, "Cascading Power Consumption", U.S. Appl. No. 13/608,479, fled Sep. 10, 2012, 34 pages.

International Search Report and Written Opinion received for PCT Patent Application No. PCT/US2013/058510, mailed on Dec. 30, 2013, 11 pages.

\* cited by examiner

300

SENSOR AND CONTEXT BASED ADJUSTMENT OF THE OPERATION OF A NETWORK CONTROLLER

TECHNICAL FIELD

The present technique relates generally to a method to adjust operation of a network controller of a device. More specifically, the present technique relates to a sensor microcontroller configured to gather contextual data from at least one sensor wherein the network controller operation may be modified based on the contextual data.

BACKGROUND ART

Some mobile platforms, such as ultrabooks, laptops, tablets, phones, and the like, connect to a network or another networked device through a network controller which may scan for available network access points or other networking devices. In some instances, multiple network connection options are available at any given time. For example, network access points may include networks such as 3G/4 G wireless wide area network (WWAN) in certain areas, and may include WiFi network access points in other areas. In some examples, a networked device connected by peer to peer networking such as WiFi, Bluetooth, WiGig may enable a mobile platform to connect directly to the networked device. In order to provide connectivity at any time, most of the mobile platforms continuously scan for network connections or for other networking devices that can be connected to by a peer to peer network.

In addition, some mobile platforms may maintain multiple network connections to enable continuous connectivity to a second network connection if a first network connection is lost. By maintaining multiple network connections, power consumption increases even if some of the network connections are relatively weak compared to others.

BRIEF DESCRIPTION OF THE DRAWINGS

The same numbers are used throughout the disclosure and the figures to reference like components and features. Numbers in the 100 series refer to features originally found in FIG. 1, numbers in the 200 series refer to features originally found in FIG. 2; and so on.

DESCRIPTION OF THE EMBODIMENTS

As discussed above, the present technique relates generally to techniques for adjusting operation of a network controller of a device. The operation of the network controller may be adjusted based on the environment or context of the device. The network controller may be coupled to a sensor controller which may gather data indicating the environment or context of the device. By using data indicating the context or environment of the device, the network controller may be able to search for available network connections in a more intelligent way, and reduce power consumption that may otherwise be wasted in searching for networks under unsuitable contexts or environments.

In embodiments, the sensor controller may also be referred to herein as a sensor controller hub or a sensor hub. The sensor controller hub may be communicatively coupled to one or more sensors as well as a main processor of a computing device.

Figure 1:
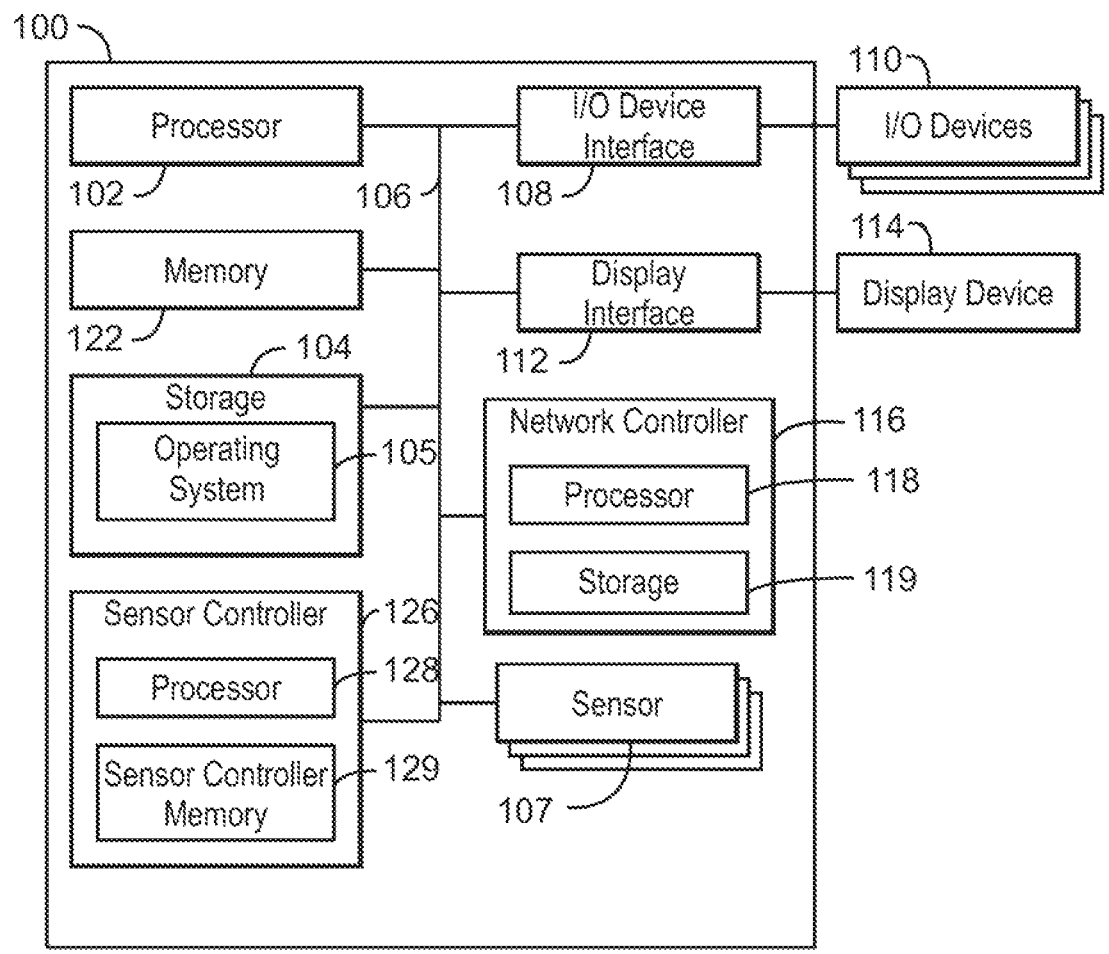
FIG. 1 is a block diagram of a computing device that can adjust operation of a network controller of the computing device, in accordance with embodiments.

FIG. 1 is a block diagram of a computing device 100 that may be used to adjust operation of a network controller, in accordance with embodiments. The computing device 100 may be, for example, a laptop computer, desktop computer, tablet computer, mobile device, server, or cellular phone, among others. The computing device 100 may include a processor 102 that is adapted to execute stored instructions, as well as a storage device 104 that stores instructions that are executable by the processor 102.

The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The processor 102 may be connected through a system bus 106 (e.g., PCI, ISA, PCI-Express, HyperTransport®, NuBus, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system bus 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100.

The storage device 104 may include a physical memory such as a hard drive, an optical drive, a flash drive, an array of drives, or any combinations thereof. The storage device 104 may also include remote storage drives. The storage device 104 may store instructions thereon to adjust network connectivity of the computing device 100.

The computing device 100 may also include a memory device 122. The memory device 122 may include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The computing device 100 may also include a network controller 116. The network controller 116 may also include an antenna configured to communicate via a wireless access point, 3G/4G or LTE transmission access point, or directly to another peer to peer wireless network connected computing device. In some embodiments, the network controller 116 includes a processor 118. The processor 118 may be distinct from a main processor of the computing device 100 such as the processor 102. The processor 118 may execute instructions stored on the storage device 104 or additional memory or storage device 119 to adjust the operation of the network controller 116 based on analyzed contextual data. The processor 118 executes instructions to adjust the operation of the network controller 116 based on contextual data history and network connection history. The computing device 100 may also include a sensor controller 126. The network controller 116 may receive analyzed contextual data from the sensor controller 126 and may modify the operation of the network controller 116 based on the analyzed contextual data. The storage device 104 or additional memory or storage device 119 may be configured to store the contextual data history and the network connection history, and the network controller 116 may, via the processor 118, adjust operation of the network controller 116 based on the contextual data history and the network connection history.

The sensor controller 126 may also include a processor 128 that is distinct from the main processor of the computing device 100 such as the processor 102. The processor 128 may execute stored instructions stored on either the memory device 122, the storage device 104, the additional memory or storage device 119, or and additional memory or storage device 129 with instructions thereon to adjust operation of the network controller 116.

The sensor controller 126 may be communicatively coupled to one or more sensors 107. The sensors 107 may be one or more sensors including: a magnetometer, a gyroscope, a global positioning system (GPS) sensor, an accelerometer, an altimeter, a barometer, a light sensor, a proximity sensor, and the like. The contextual data, as referred to herein, is data indicating the environment of the computing device 100. The contextual data is data gathered from the one or more sensors 107 and can include various data such as magnetic headings, magnetic north, linear acceleration, rotational velocity, global position, altitude, pressure, ambient light, proximity to a user or another device, and the like. In some embodiments, the sensors 107 are connected to processor 102 via bus 106. In some embodiments, the sensors 107 are connected directly to processor 128 via a private bus (not shown), and communicatively coupled to processor 102 through processor 128 acting as intermediary. The sensors 107 may gather contextual data related to the context or environment of the computing device 100. In addition to gathering contextual data from the one or more sensors 107, contextual data may be gathered from a human input device such as a keyboard, a mouse, a touchscreen, and the like. Contextual data may also be gathered from the network controller 116 to indicate a status of a network connection to determine whether a current network connection is currently established. Contextual data may also be gathered from the storage device 104 wherein the contextual data may include network connection history and contextual data associated with a network connection history. Contextual data may also be gathered from a storage location 104 or from Internet storage (not shown) wherein the contextual data may include the calendric schedule of the user, cross-referenced with the current time, so that user activity and/or schedule may be determined. The sensor controller 126 may analyze the contextual data to determine the context of the computing device 100.

In one embodiment, the contextual data is analyzed by processor executable code at the sensor controller 126 to detect whether the computing device is in motion. In another embodiment, the contextual data is analyzed by processor executable code at the sensor controller 126 to detect whether the computing device is moving outside of a predefined radius. In another embodiment, the contextual data is analyzed by processor executable code at the sensor controller 126 to detect whether the computing device is moving at a velocity specified to be associated with an activity. In another embodiment, the contextual data is analyzed by processor executable code at the sensor controller 126 to detect whether the computing device is in use. In another embodiment, the contextual data is analyzed by processor executable code at the sensor controller 126 to detect human proximity with respect to the computing device. In another embodiment, the contextual data is analyzed by processor executable code at the sensor controller 126 to detect a geographic location of the computing device.

In these and other embodiments, the analyzed contextual data may be provided to the network controller 116 which may, via the processor 118 of the network controller 116, modify the network controller operation based on the analyzed contextual data provided from the sensor controller 126. The network controller 116 may be configured to scan for available networks at a specified scan rate. In some embodiments, modifying the operation of the network controller 116 includes modifying the specified scan rate of the network controller 116. In some embodiments, modifying the operation of the network controller 116 includes preventing a current flow to a radio sensor. In each case, such modifications may result in reduced power consumption relative to the modifications not having been made.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
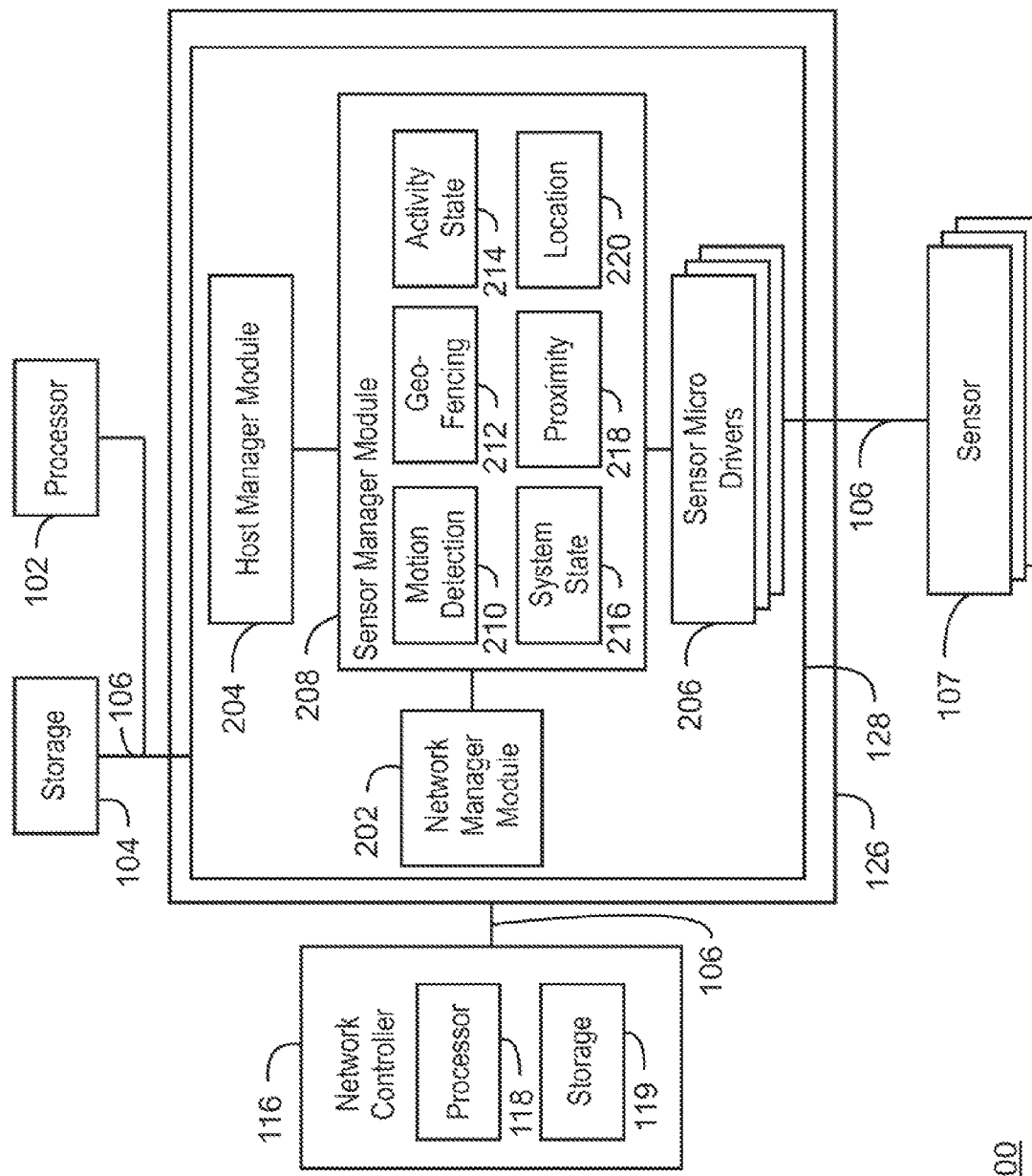
FIG. 2 is a block diagram of a system for adjusting operation of a network controller of a device, in accordance with embodiments.

FIG. 2 is block diagram of a system for adjusting operation of a network controller of a device, in accordance with embodiments. The system 200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

As depicted in FIG. 2, the system 200 may include a sensor controller 126, a network controller 116, a storage device 104, and a processor 102. The sensor controller 126 may be communicatively coupled to the storage device 104 and processor 102 of the computing device 100 via the system bus 106 as discussed above in reference to FIG. 1. In some embodiments, the processor 102 is the main processor or central processing unit of the computing device 100. The sensor controller 126 may be communicatively coupled to the network controller 116 via the system bus 106. Further, the one or more sensors 107 of the system 200 may be communicatively coupled to the sensor controller 126 via the system bus 106. The portion of the system bus 106 that communicatively couples the one or more sensors 107 to the sensor controller 126 may include, but is not limited to, an I2C bus, a USB cable, a PCIe bus, and the like.

The sensor controller 126 may include the processor 128. A main processor, such as the processor 102, may consume relatively more power than the processor 128 or the processor 118 of the network controller 116. The instructions involved in adjusting the operation of the network controller 116 may be carried about by the processor 128, and alternatively or additionally, the processor 118 rather than the processor 102 of the computing device 100. By including the processor 128 and the processor 118, power may be saved in processing the task of adjusting the operation of the network controller 116.

The sensor controller 126 may be configured to receive contextual data from one or more sensors 107 communicatively coupled to a device, such as the computing device 100 of FIG. 1. The processor 128 may be configured to analyze the contextual data via one or more components or modules. The one or more components or modules may include: a network manager module 202, a host manager module 204, one or more sensor microdrivers 206, and a sensor manager module 208. The sensor manager module 208 may include additional modules configured to analyze contextual data received from the one or more sensors 107. The modules of the sensor manager module 208 may include: a motion detection module 210, a geo-fencing module 212, an activity module 214, a system state module 216, a proximity module 218, a location module 220, and the like.

The sensor controller 126 may be communicatively coupled to the network controller 116, and may provide the analyzed contextual data to the network controller 116. The network controller 116 may, via the processor 118, modify the operation of the network controller 116 based on the analyzed contextual data.

The network controller 116 may be configured to scan for available networks at a specified scan rate. Modification of the network controller 116 operation may include modifying the specified scan rate of the network controller 116. In operation, the sensor controller 126 may receive contextual data from the one or more sensors 107 at the one or more sensor microdrivers 206. The one or more sensor microdrivers 206 may be configured to format the contextual data received from the sensors by removing any vendor-specific data, including vendor registry sets, that may be included in the contextual data due to a specific vendor or a specific type of the one or more sensors 107 from which the contextual data is received. The one or more sensor microdrivers 206 may provide the contextual data to the sensor manager module 208. The sensor manager module 208 may carry out various operations according to the type of data received from the one or more sensor microdrivers 206.

For example, one of the one or more sensors 107 may be an accelerometer. The contextual data may be gathered from the accelerometer and may be provided to the motion detection module 210 of the sensor manager module 208. The motion detection module 210 may analyze the contextual data from the accelerometer and may determine or detect whether the system 200 is stationary or in motion. The motion detection module 210 may provide the analyzed contextual data indicating that the system 200 is stationary, for example, to the network manager module 202 which may be configured to provide the analyzed contextual data to the network controller 116. The network controller 116 may determine that the system 200 is stationary and is connected to a WiFi network connection access point. The network controller 116 may modify scan rates for additional network connection access points including 3G, 4G, or LTE access points, by disabling or reducing the rate for scanning for these access points while the system 200 is stationary and connected to the WiFi network connection access point. By disabling scanning for additional network connection access points available on a 3G, 4G, or LTE network when the system 200 is stationary, the power consumption of the system 200 may be reduced while the system 200 is stationary and connected to a WiFi network connection access point.

In another example, contextual data gathered from the accelerometer may indicate that the system 200 is moving. In this example, the activity module 214 may detect whether the system 200, or a device using the system 200, is moving at a velocity specified to be associated with an activity, such as driving an automobile or flying in an airplane. The activity module 214 may analyze the contextual data to determine that the system 200 is moving at rate that exceeds that of walking, or greater than 7 miles per hour for example. The analyzed contextual data may be provided to the network controller 116 via the network manager module 202. The network controller 116 may modify the scan rate by disabling scanning for WiFi network access points while the system 200 is moving at the velocity specified to be associated with the activity. Thus, when traveling in a car, scanning for roadside WiFi network access points may be disabled to avoid extra scanning. Instead, the network controller 116 may scan for available 3G, 4G, or LTE network access points. By scanning for network access points such as the 3G, 4G, or LTE network access points, and disabling scanning for WiFi network access points, the power consumption of the system 200 may be reduced while maintaining a network connection more suitable based on the context of the system 200.

In another example, the contextual data from the accelerometer may indicate that the system 200 is moving, and the activity module 214 may determine that the system 200 is moving at a rate that exceeds that of driving in an automobile, or greater than 120 miles per hour for example. In this example, the rate that exceeds that of driving in an automobile may be associated with flying in an airplane. The analyzed contextual data indicating the rate of travel may be provided to the network controller 116 via the network manager module 202. The network controller 116 may modify the scan rate by disabling scans for WiFi, 3G, 4G, or LTE network access points. For example, when traveling in an airplane, the contextual data may indicate motion greater than 120 miles per hour, and the network controller 116 may disable all scanning for network access points. In some embodiments, this may be referred to as an "automatic airplane" feature. The automatic airplane feature may include disabling scanning for available networks when the sensor controller 126 detects that the system 200 is moving at a rate that may be associated with airplane travel. Data from additional sensors, such as an altimeter to indicate altitude may further confirm this assessment. Further, a very recent location of a an airport (using GPS data) may also provide an indication that the current motion is that of an airplane take-off.

In another example, the network controller 116 may disable WiFi scanning only during take-off and landing even if the automatic airplane feature discussed above has been enabled. For example, one of the one or more sensors 107 may be an altimeter and the contextual data may include altimeter data indicating a change in pressure as well as the contextual data indicating motion at the rate that exceeds that of driving in an automobile. In this example, the activity module 214 may monitor the contextual data indicating a change in altitude as well as the contextual data indicating motion at the rate that exceeds that of driving an automobile. The activity module 214 may provide the contextual data to the network controller 116. The network controller 116 may disable scans for WiFi, 3G, 4G, or LTE network access points during rapid change in altitude which may be associated with take-off or landing of an airplane, but enable WiFi scanning when the contextual data indicates only small changes in altitude which may be related to a cruising altitude of an airplane.

In another example, one of the one or more sensors 107 may be a GPS sensor and contextual data may be gathered indicating a location of the system 200. In this example, the network controller 116 may receive contextual data indicating the location of the system 200 one of the one or more sensors 107 such as a GPS sensor. The network controller 116 may also receive data indication previous history of access points associated with the location. Based on the location and previous history, the network controller 116 may disable scanning for access points if the previous history indicates that there are no access points available in the location indicated. By disabling scanning based on previous history and the contextual data, the system 200 may reduce power consumption that may otherwise be used to scan for network access points.

In another example, contextual data may be gathered indicating a location of the system 200 and previously stored history may indicate that there are no 3G, 4G, or long term evolution (LTE) network access points available at the location indicated. In this example, the network controller 116 may disable scanning for 3G, 4G, or LTE network access points while continuing to scan for WiFi network access points. By disabling scanning for some types of network access points while continuing scanning for other types of access points, the system 200 may reduce power consumption based on previously stored history of access points associated with the contextual data gathered.

The network controller 116 may also be configured to select a network from among multiple available networks based on the contextual data indicating a location of the system 200 and contextual data indicating previously stored history of higher cost networks in contrast to lower cost networks. For example, the contextual data indicating a previous history of connectivity associated with the location of the system 200 may indicate that a WiFi network access point is known at the location and at a lower power cost than another 3G, 4G, or LTE network access point at a higher power cost. The network controller 116 may modify operation by scanning first for the known WiFi access point. The network controller 116 may also modify operation by disabling scanning for 3G, 4G, and or LTE network access points, or scanning for 3G, 4G, or LTE network access points second to scanning for the known low-power cost WiFi network access point associated with the location-based contextual data.

In some embodiments, contextual data is related to the location of the system 200, the current connection status of the system 200, and movement of the system 200. For example, the contextual data may indicate that the system 200 is connected to a WiFi network access point, is at a particular location, and is stationary. While the system 200 is stationary, scanning for additional network access points may be disabled at the network controller 116. However, in the event that the contextual data indicates that the system 200 is moving outside a predefined radius, the network controller 116 may begin scanning for available networks. In these and other embodiments, the geo-fencing module 212 is configured to detect whether the system 200, or the device 100 of FIG. 1, is moving outside the predefined radius. For example, the contextual data may also indicate that the system 200 is in motion and has departed a five meter radius of the previously stationary location, and may rescan for available network access points. By disabling scanning when the system 200, and or device 100, is stationary, the system 200 may reduce the level of power consumption that may otherwise be used by continuously scanning for available network access points. However, a new network connection may be useful due to the change in location. Therefore, the network controller 116 may enable scanning if the contextual data indicates movement outside the predefined radius, and thereby power consumed by scanning for available network access point may be reduced or reserved for more advantageous times or environments indicated by the contextual data.

In some embodiments, the contextual data is related to the state of the system 200, such as whether the system 200 is in use. For example, one of the one or more sensors 107 may be an ambient light sensor and the contextual data may be gathered from an ambient light sensor indicating that the system 200 is in a dark environment such as a bag or backpack. The contextual data may also be gathered from a human input device, such as a keyboard, a mouse, a touchscreen, or any combination thereof, indicating that the system 200 is in use. The system state module 216 may analyze the contextual data to determine whether the dark environment is due a particular environment where the system 200 or the computing device 100 is in use such as a dark room, or a particular environment where the system 200 or the computing device 100 is in a backpack, for example, and not in use. The network controller 116 may, based on the contextual data, disable scanning for network access points while the system 200 or the computing device 100 is in a dark environment and not in use.

In some embodiments, one of the one or more sensors 107 is a proximity sensor and the contextual data is related to the proximity of a user of the system 200. For example, the contextual data may be gathered from a proximity sensor such as an infrared detection sensor, a laser sensor, an electromagnetic proximity sensor, an ultrasonic sensor, and the like. The contextual data gathered from the proximity sensor may indicate that a user is nearby. The proximity module 218 may analyze the contextual data to determine that a user is nearby, and may provide the analyzed contextual data to the network controller 116 via the network manager module 202. The network controller 116 may begin scanning for available network access points due to the analyzed contextual data which indicates that the user is nearby. Similarly, if the analyzed contextual data indicates that a user is not nearby, the network controller 116 may disable scanning for available network access points. By scanning for available network access points when the user is nearby, and disabling scanning when the user is not nearby, the system 200 may reduce power consumption that would otherwise be used by constantly scanning for network access points.

Figure 3:
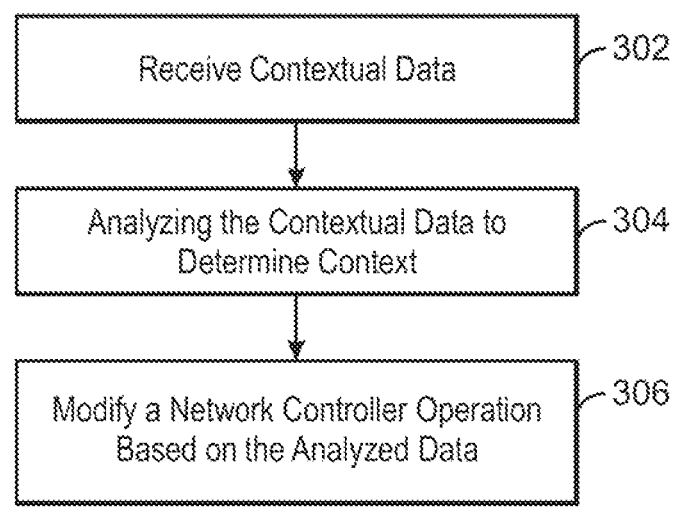
FIG. 3 is a process flow diagram showing a method for adjusting operation of a network controller of a device, in accordance with embodiments.

FIG. 3 is a process flow diagram showing a method 300 for adjusting the operation of a network controller of a device, in accordance with embodiments. The method may be executed by receiving contextual data from a sensor communicatively coupled to the device, analyzing the contextual data to determine the context of the device; and modifying the network controller operation based on the analyzed contextual data.

At block 302, contextual data is received from a sensor communicatively coupled to the device. The sensor may be one or more sensors including a magnetometer, a gyroscope, a GPS sensor, an accelerometer, an altimeter, a barometer, a light sensor, a proximity sensor, or any combination thereof. In some embodiments, the contextual data is also received from a human input device such as a touchscreen, keyboard, or a mouse for example. In some embodiments, the contextual data is also received from the network controller indicating a network connection status, or a storage device configured to store network connection history and associated contextual data. In these and other embodiments, previous network connections is associated with the context in which the previous network connections were established as described in more detail below.

At block 304, where the contextual data is analyzed to determine the context of the device. The context of the device may include the location of the device, the motion of the device, the activity of the device, the proximity of a user to the device, the system state of the device, the network connection history and associated context of the device, and the like.

At block 306, where the operation of the network controller is modified based on the analyzed data. The method 300 may therefore be used to analyze the context of the device and adjust the scan rate of the network controller in view of the context. For example, the contextual data may indicate that the device is stationary and therefore, continual scanning may not be used. In some embodiments, the network controller is configured to select a network from available networks and modify the network controller operation by selecting a type of network connection based on the network connection history and the associated contextual data. In this and other embodiments, the method 300 is used to adjust the type of network connection to be established. For example, the network controller may, based on a location and previously stored history, scan for a network based on the network connection history of the device in the location detected. By enabling the network controller to adjust or modify the scan rate based on the contextual data, the power consumption of the device may be reduced in comparison to a network controller that continuously scans or scans without an indication of the context of the device.

In some embodiments, the method 300 is implemented by a sensor controller communicatively coupled to a device. The sensor controller may also be communicatively coupled to the network controller. In these and other embodiments, the sensor controller analyzes the contextual data instead of a requiring a main processor or CPU of the device to analyze the contextual data. By enabling the sensor controller to analyze contextual data, power consumption may be reduced relative to the power consumption that may be used if the main processor or CPU analyzed the contextual data.

Analyzing the contextual data to determine the context of the device may also include additional steps. In some embodiments, the method 300 may detect altimeter data from an altimeter sensor, and may analyze the contextual data by computing a rate of change of air pressure based on the altimeter data. In some embodiments, the network controller operation may be modified based on the rate of change of air pressure by preventing a current flow to a radio sensor, Power consumption may be reduced thereby.

Examples of a computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile Internet device (MID), messaging device, data communication device, and the like.

An example of a computing device may also include a computer that is arranged to be worn or grasped by a person, such as a wrist computer, finger computer, ring computer, eyeglass computer, belt-clip computer, arm-band computer, shoe computer, clothing computer, pen computer, puck computer, or any other suitable type of wearable or graspable computer. For example, the computing device may be implemented as a smart phone capable of executing computer applications, as well as voice communications or data communications. Although some embodiments may be described with a computing device implemented as a smart phone by way of example, it may be appreciated that other embodiments may be implemented using other mobile computing devices as well. The computing device may also include a graphics processing unit (GPU) that is configured to execute stored instructions and a storage device that stores instructions.

Figure 4:
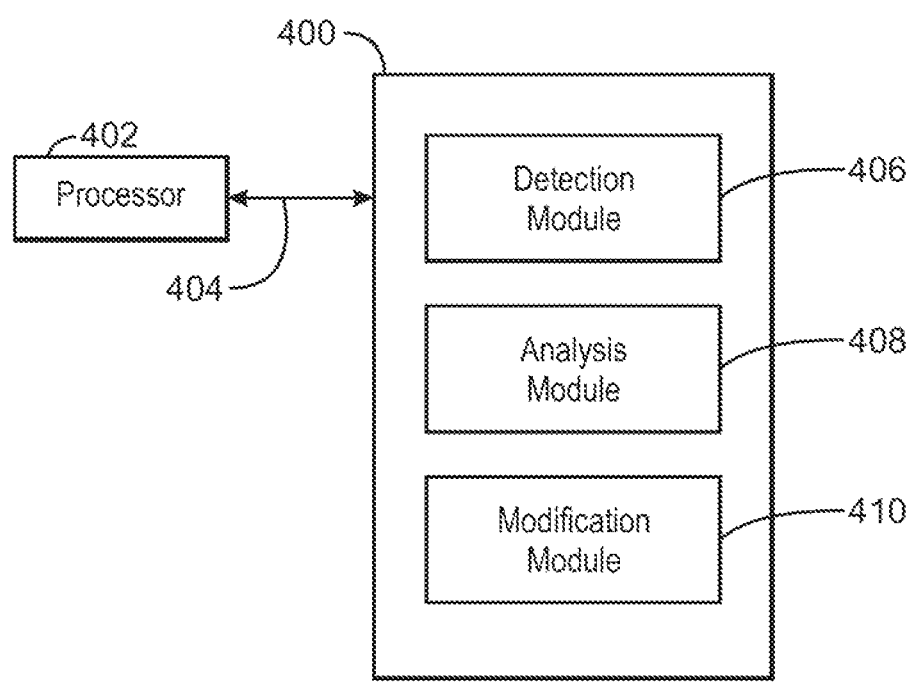
FIG. 4 is a block diagram showing a tangible, non-transitory computer readable medium that stores code for adjusting operation of a network controller of a computing device, in accordance with embodiments.

FIG. 4 is a block diagram showing a tangible, non-transitory, computer-readable medium 400 that stores code for adjusting operation of a network controller of a computing device, such as the computing device of FIG. 1, in accordance with embodiments. The tangible, non-transitory, computer-readable medium 400 may be accessed by a processor 402 over a computer bus 404. Furthermore, the tangible, non-transitory, computer-readable medium 400 may include code configured to direct the processor 402 to perform the methods described herein.

The various software components discussed herein may be stored on the tangible, non-transitory computer-readable medium 400, as indicated in FIG. 4. For example, a detection module 406 may be configured to receive contextual data. The contextual data may be received from one or more of: a sensor communicatively coupled to the computing device, a human input device, the network controller configured to indicate a status of a network connection, a storage device configured to store network connection history and contextual data.

The non-transitory computer-readable medium 400 may also include an analysis module 408 configured to analyze the contextual data to determine the context of the computing device. The analysis module 408 may also associate contextual data history with network connection history.

The non-transitory computer-readable medium 400 may also include a modification module 410 configured to modify the operation of a network controller of the computing device based on the analyzed contextual data provided by the analysis module 408. The operation of the network controller may include scanning for available networks at a specified scan rate. The modification may include modifying the specified scan rate of the network controller. In some embodiments, the modification may include scanning for a specific type of available networks based on contextual data including contextual data history and network connection history. In some embodiments, the modification may include preventing a current flow to a radio sensor.

EXAMPLE 1

A method is described herein. The method may include receiving contextual data from a sensor communicatively coupled to the device. The method may also include analyzing the contextual data to determine the context of the device. The method may also include modifying the network controller operation based on the analyzed contextual data.

The contextual data may be gathered in parallel to analyzing contextual data that may have been previously gathered. Also, the contextual data may be gathered in parallel to modifying the network controller. Further, the network controller may be modified while contextual data is continuing to be gathered.

EXAMPLE 2

A computing device to adjust operation of a network controller is described herein. The computing device may include a storage device to store instructions for adjusting operation of the network controller. The computing device may also include a processor that executes the stored instructions to receive contextual data from a sensor communicatively coupled to the computing device. The stored instructions may also analyze the contextual data to determine the context of the computing device. The stored instructions may also modify the network controller operation based on the analyzed contextual data.

The computing device may be a sensor controller. The computing device may be a first computing device communicatively coupled to the network controller and to a main processor of a second computing device. The processor of the first computing device may be smaller, and consume relatively less power than, the main processor of the second computing device. The first computing device may contain more than one processor and more than one storage device.

EXAMPLE 3

A system to adjust network connectivity operation is described herein. The system may include a sensor controller to receive contextual data from a sensor communicatively coupled to a device and analyze the contextual data to determine the context of the device. The system may also include a network controller to modify the network controller operation based on the analyzed contextual data.

The system may be implemented as a computing device where the sensor controller is a sensor controller hub and communicatively couples one or more sensors to a network controller of the computing device. The sensor controller hub may also communicatively couple a main processor of the computing device. The system may also include more than one network controller and the sensor controller hub may be communicatively coupled to each network controller of the system.

EXAMPLE 4

At least one computer-readable medium is described herein. The at least one computer-readable medium may have instructions stored therein that, in response to being executed on a computing device, cause the computing device to receive contextual data. The instructions may also case the computing device to analyze the contextual data to determine the context of the computing device. The instructions may also case the computing device to modify operation of a network controller of the computing device based on the analyzed contextual data.

The instructions may be carried out in a different order. For example, the contextual data may be gathered in parallel to analyzing contextual data previously gathered. Also, the contextual data may be analyzed concurrently with modifying the operation of the network controller. Also, the modification of the network controller may occur in parallel to gathering contextual data.

In the preceding description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment," "one embodiment," or "some embodiments" are not necessarily all referring to the same embodiments.

Not all components, features, structures, characteristics etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement o order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams or state diagrams may have been used herein to describe embodiments, the techniques are not limited to those diagrams or to corresponding descriptions herein. For example, flow may not move through each illustrated box or state or in exactly the same order as illustrated and described herein.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A method to adjust operation of a network controller of a device, comprising:
receiving contextual data from a sensor communicatively coupled to the device;

analyzing the contextual data to determine the context of the device; and modifying the network controller operation based on the analyzed contextual data, wherein modifying the network controller operation comprises modifying a type of network access point that is scanned based on the contextual data.

2. The method of claim 1, wherein the contextual data is received from a sensor comprising at least one of:
a magnetometer;
a gyroscope;
a global positioning system sensor;
an accelerometer;
an altimeter;
a barometer;
a light sensor;
a proximity sensor; or
any combination thereof.

3. The method of claim 1, wherein:
the network controller is a component to scan for available networks at a specified scan rate; and
modifying the network controller operation comprises modifying the specified scan rate of the network controller based on the analyzed contextual data.

4. The method of claim 1, wherein the contextual data is received from components comprising;
a human input device;
the network controller to indicate a status of a network connection; and
a storage device to store network connection history and associated contextual data.

5. The method of claim 4, wherein
the network controller is a component to select a network from among available networks; and
modifying the network controller operation comprises selecting a type of network connection based on the network connection history and the associated contextual data.

6. The method of claim 1, wherein analyzing the contextual data to determine the context of the device comprises:
detecting altimeter data from an altimeter sensor; and
computing a rate of change of air pressure based on the altimeter data.

7. The method of claim 6, wherein modifying the network controller operation based on the contextual data comprises preventing a current flow to a radio sensor based on the rate of change of air pressure.

8. A computing device to adjust operation of a network controller, comprising:
a storage device to store instructions for adjusting operation of the network controller; and
a processor that executes the stored instructions to:
receive contextual data from a sensor communicatively coupled to the computing device;
analyze the contextual data to determine the context of the computing device; and
modify the network controller operation based on the analyzed contextual data, wherein modifying the network controller operation comprises modifying a type of network access point that is scanned based on the contextual data.

9. The computing device of claim 8, wherein the contextual data is received from a sensor comprising at least one of:
a magnetometer;
a gyroscope;
a global positioning system sensor;
an accelerometer;
an altimeter;
a barometer;
a light sensor;
a proximity sensor; or
any combination thereof.

10. The computing device of claim 8, wherein the contextual data is received from components comprising;
a human input device;
the network controller to indicate a status of a network connection; and
a storage device to store network connection history and contextual data.

11. The computing device of claim 8, wherein:
the network controller is to scan for available networks at a specified scan rate; and
modifying the network controller operation comprises modifying the specified scan rate of the network controller based on the analyzed contextual data.

12. The computing device of claim 8, further comprising processor executable code that causes the processor to:
associate contextual data history with network connection history; and
modify the network controller operation by selecting a type of network connection based on the network connection history and the associated contextual data.

13. The computing device of claim 8, wherein the contextual data is analyzed by processor executable code that causes the processor to detect one or more of:
whether the computing device is in motion; and
whether the computing device is moving outside of a predefined radius.

14. The computing device of claim 8, wherein the contextual data is analyzed by processor executable code that causes the processor to detect whether the computing device is moving at a velocity specified to be associated with an activity.

15. The computing device of claim 8, wherein the contextual data is analyzed by processor executable code that causes the processor to detect whether the computing device is in use.

16. The computing device of claim 8, wherein the contextual data is analyzed by processor executable code that causes the processor to detect human proximity with respect to the computing device.

17. The computing device of claim 8, wherein the contextual data is analyzed by processor executable code that causes the processor to detect a geographic location of the computing device.

18. A system to adjust network connectivity operation, comprising:
a sensor controller to receive contextual data from a sensor communicatively coupled to a device and analyze the contextual data to determine the context of the device; and
a network controller to modify the network controller operation based on the analyzed contextual data, wherein modifying the network controller operation comprises modifying a type of network access point that is scanned based on the contextual data.

19. The system of claim 18, wherein:
the network controller is to scan for available networks at a specified scan rate; and
modifying the network controller operation comprises modifying the specified scan rate of the network controller based on the analyzed contextual data.

20. The system of claim 19, wherein the contextual data is received from additional components comprising;

a human input device;
the network controller indicating a status of a network connection; and
a storage device to store network connection history and associated contextual data.

21. The system of claim 20, wherein
the network controller is to select a network from among available networks; and
modifying the network controller operation comprises selecting a type of network connection based on the network connection history and the associated contextual data.

22. The system of claim 18, wherein the contextual data is analyzed by a motion detection module to detect whether the device is in motion.

23. The system of claim 18, wherein the contextual data is analyzed by a geo-fencing module to detect whether the device is moving outside of a predefined radius.

24. The system of claim 18, wherein the contextual data is analyzed by an activity module to detect whether the device is moving at a velocity specified to be associated with an activity.

25. The system of claim 18, wherein the contextual data is analyzed by a system state module to detect whether the device is in use.

26. The system of claim 18, wherein the contextual data is analyzed by a proximity detection module to detect human proximity with respect to the device.

27. The system of claim 18, wherein the contextual data is analyzed by a location module to detect a geographic location of the device.

28. The system of claim 18, wherein:
the sensor is communicatively coupled to the sensor controller; and
the sensor controller is communicatively coupled to the network controller and a main processor of the device.

29. The system of claim 18, wherein the sensor controller is a sensor controller hub having sensors communicatively coupled to the sensor controller hub, and the sensor controller hub being communicatively coupled to the main processor.

30. At least one computer-readable medium having instructions stored therein that, in response to being executed on a computing device, cause the computing device to:
receive contextual data;
analyze the contextual data to determine the context of the computing device; and
modify operation of a network controller of the computing device based on the analyzed contextual data, wherein modifying the operation of the network controller comprises modifying a type of network access point that is scanned based on the contextual data.

31. The at least one computer-readable medium of claim 30, wherein the contextual data is received from one or more of a:
sensor communicatively coupled to the computing device;
a human input device;
the network controller to indicate a status of a network connection; and
a storage device to store network connection history and contextual data.

32. The at least one computer-readable medium of claim 31, wherein the instructions stored on the at least one computer-readable medium, in response to being executed, cause the computing device to:
associate contextual data history with network connection history; and
modify the network controller operation by selecting a type of network connection based on the network connection history and the associated contextual data.

33. The at least one computer-readable medium of claim 30, wherein:
the network controller is to scan for available networks at a specified scan rate; and modifying the network controller operation comprises modifying the specified scan rate of the network controller.

* * * * *